United States Patent
Yvon et al.

(10) Patent No.: US 11,578,744 B2
(45) Date of Patent: Feb. 14, 2023

(54) METHOD FOR ASSEMBLING A BEAM AND A STRUCTURAL ELEMENT OF AN AIRPLANE SEAT

(71) Applicant: Safran Seats, Plaisir (FR)

(72) Inventors: Florent Yvon, La Roche Clermault (FR); Jérémy Cailleteau, Saint Aout (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 17/296,171

(22) PCT Filed: Nov. 18, 2019

(86) PCT No.: PCT/EP2019/081589
§ 371 (c)(1),
(2) Date: May 21, 2021

(87) PCT Pub. No.: WO2020/109043
PCT Pub. Date: Jun. 4, 2020

(65) Prior Publication Data
US 2022/0009639 A1    Jan. 13, 2022

(30) Foreign Application Priority Data

Nov. 26, 2018 (FR) ........................................ 1871820
Jan. 24, 2019 (FR) ........................................ 1900616

(51) Int. Cl.
*B64D 11/06*    (2006.01)
*F16B 17/00*    (2006.01)
*B21D 39/06*    (2006.01)

(52) U.S. Cl.
CPC .............. *F16B 17/00* (2013.01); *B21D 39/06* (2013.01); *B64D 11/0648* (2014.12); *F16B 17/004* (2013.01); *B64D 11/0649* (2014.12)

(58) Field of Classification Search
CPC .... B64D 11/0648; F16B 17/00; F16B 17/004; F16B 9/07
See application file for complete search history.

(56) References Cited

U.S. PATENT DOCUMENTS 2,959,207 A    11/1960    Brewster
5,730,492 A    3/1998    Warrick et al.
(Continued)

FOREIGN PATENT DOCUMENTS

CZ    2018387 A3  *  2/2020
DE    102018110229 A1 *  9/2019 ............... B60N 2/10
(Continued)

OTHER PUBLICATIONS

International Patent Application No. PCT/EP2019/081589, International Search Report (and English translation) and Written Opinion, dated Jan. 30, 2020.

*Primary Examiner* — Timothy J Brindley
(74) *Attorney, Agent, or Firm* — Kilpatrick Townsend & Stockton LLP

(57) ABSTRACT

The present invention essentially relates to a method for assembling a beam and a structural element of an aircraft seat, characterised in that it comprises:
- a step of producing at least one recess in an inner face of a beam passage area of the structural element,
- a step of inserting the beam into the beam passage area, and
- a step of deforming the beam such that a deformed portion of the beam penetrates into the recess of the beam passage area.

14 Claims, 7 Drawing Sheets

(56) References Cited

U.S. PATENT DOCUMENTS

| | | | |
|---|---|---|---|
| 2011/0001350 A1 | 1/2011 | Schmitz et al. | |
| 2013/0277955 A1 * | 10/2013 | Wagner | F16B 17/004 29/505 |
| 2021/0387732 A1 * | 12/2021 | Salzer | B64D 11/0693 |

FOREIGN PATENT DOCUMENTS

| | | | | |
|---|---|---|---|---|
| EP | 3885263 A1 * | 9/2021 | | B64D 11/0624 |
| FR | 2898946 A1 * | 9/2007 | | F16B 11/002 |
| FR | 2942431 A1 | 8/2010 | | |
| GB | 2495395 A * | 4/2013 | | E04G 7/20 |
| JP | H07116751 A | 5/1995 | | |
| JP | 2019123011 A * | 7/2019 | | B21D 39/044 |
| WO | WO-2015187633 A1 * | 12/2015 | | B64D 11/06 |
| WO | WO-2019081512 A1 * | 5/2019 | | B21D 22/04 |
| WO | WO-2020184788 A1 * | 9/2020 | | |
| WO | WO-2021030878 A1 * | 2/2021 | | |
| WO | WO-2022039788 A1 * | 2/2022 | | |

* cited by examiner

[Fig. 1]
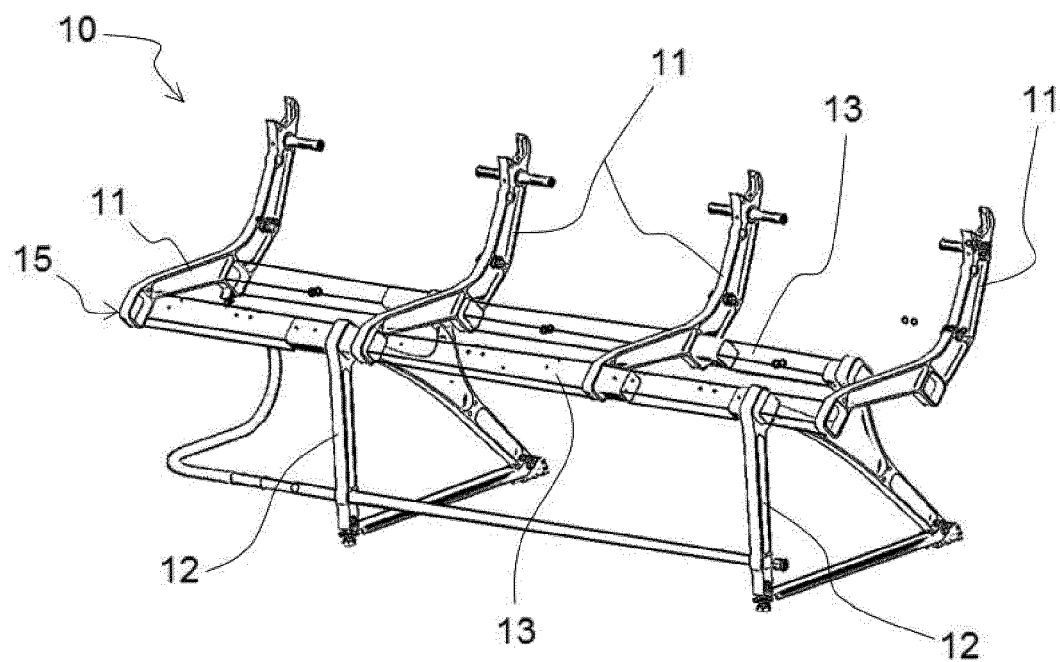
[Fig. 2a]
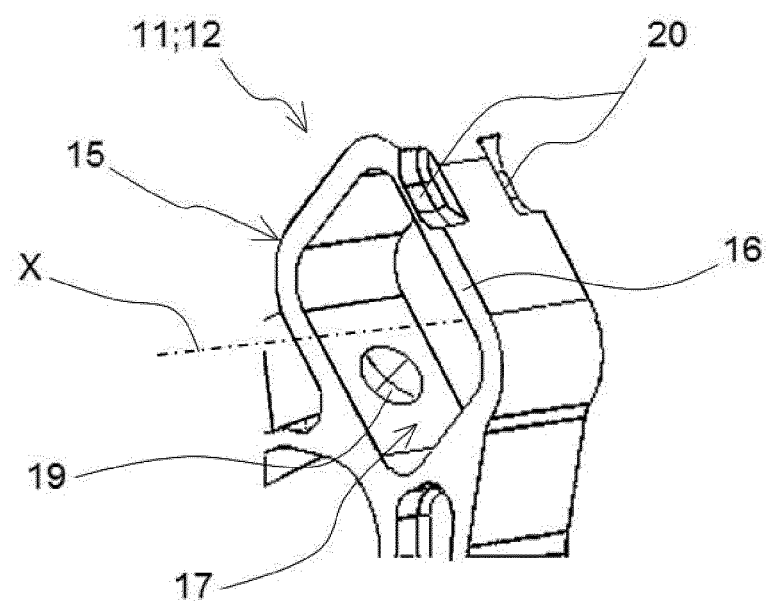

[Fig. 2b]
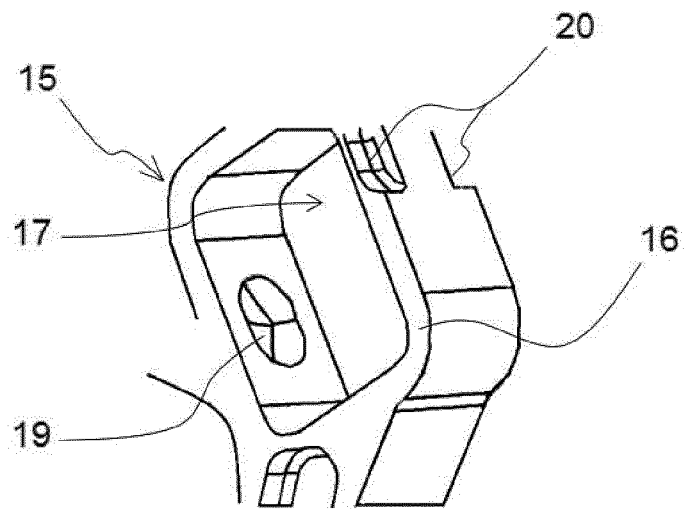
[Fig. 3]
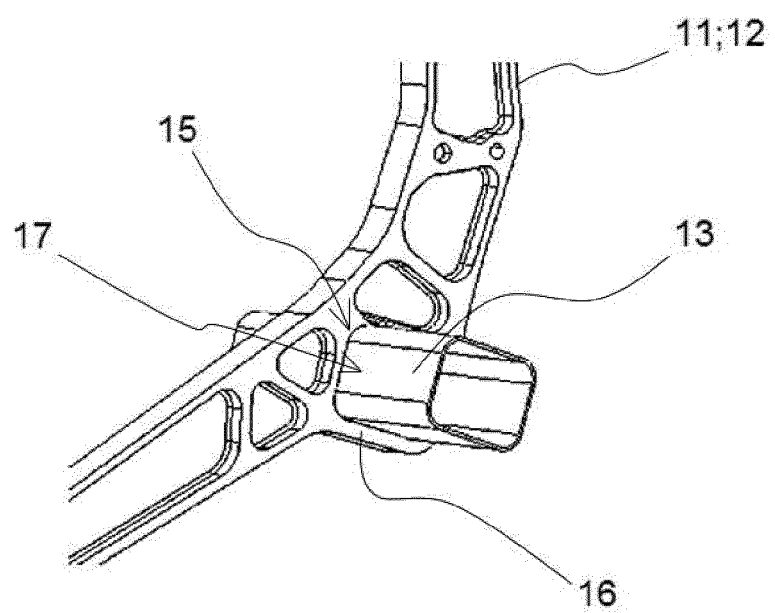

[Fig. 4a]
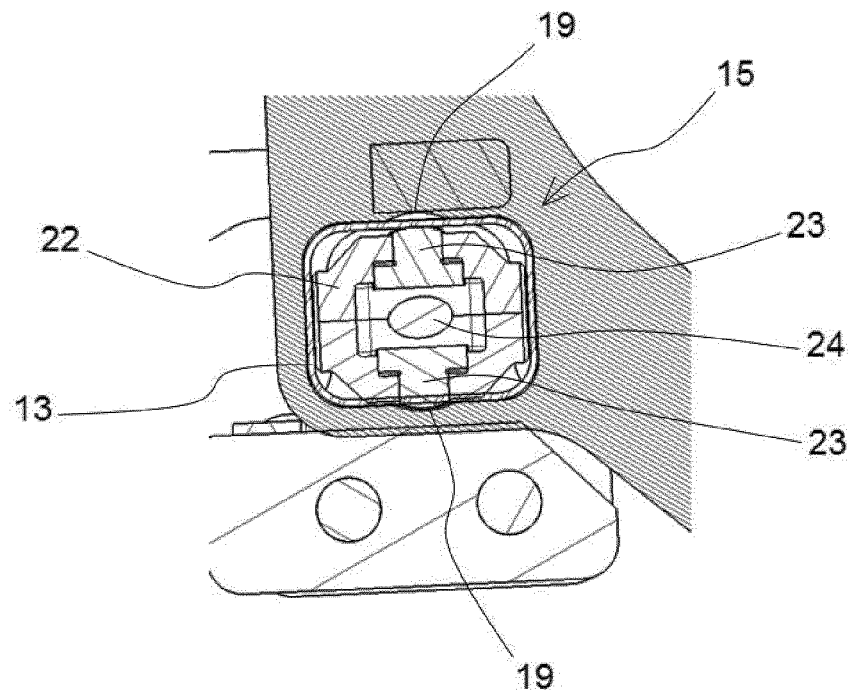
[Fig. 4b]
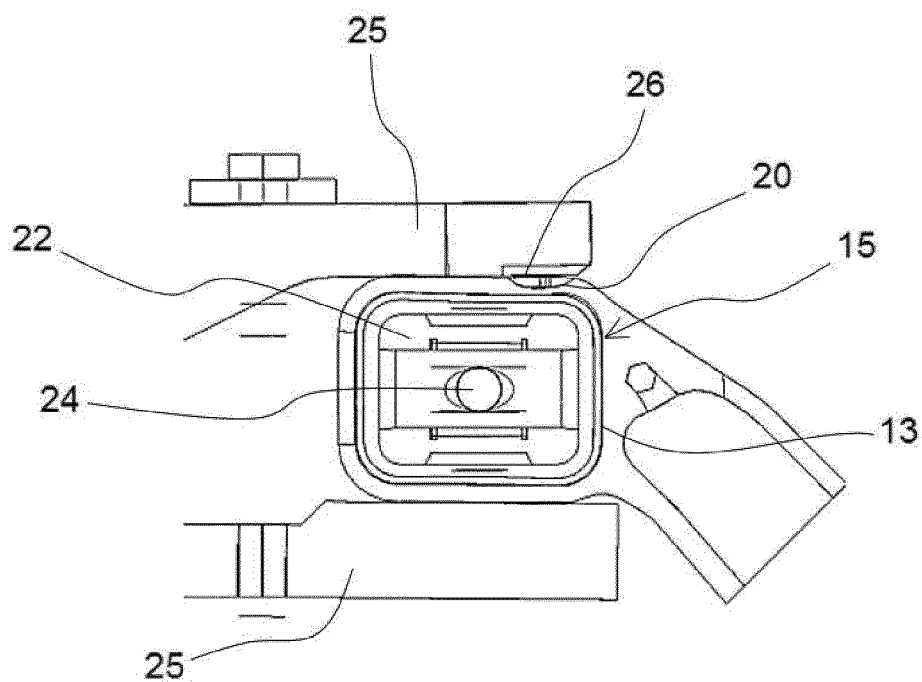

[Fig. 5a]
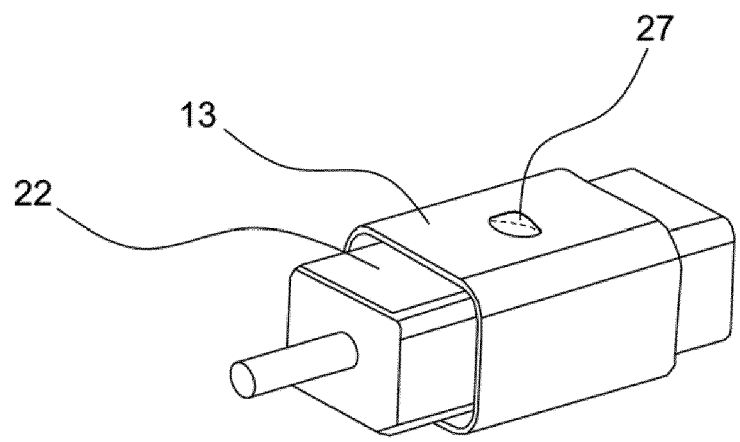
[Fig. 5b]
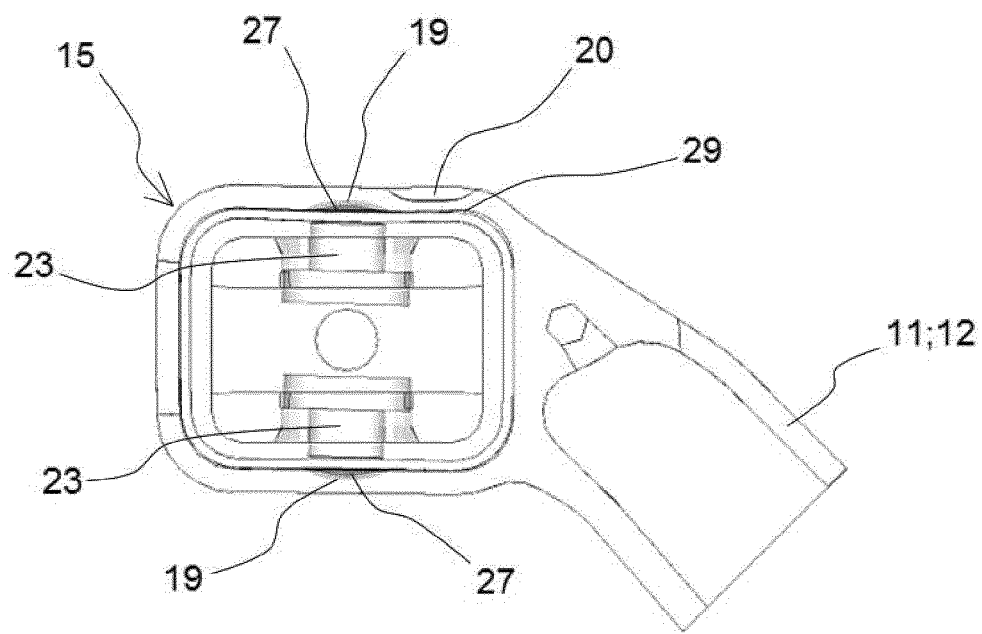

[Fig. 6a]
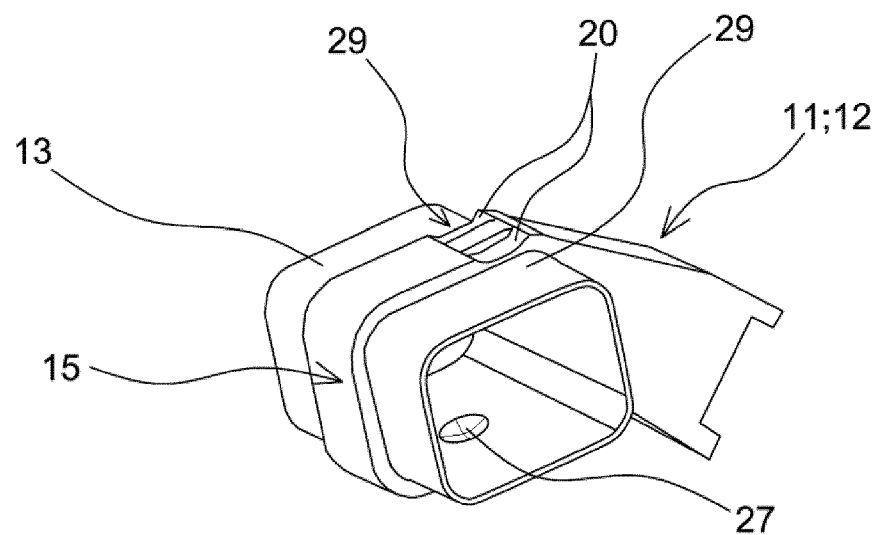
[Fig. 6b]
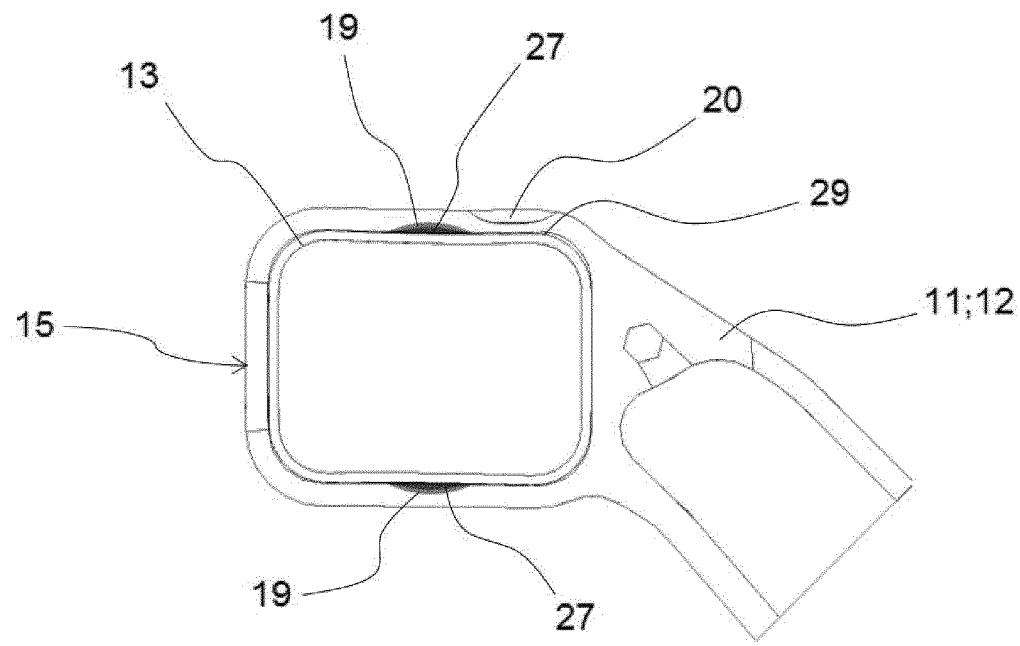

[Fig. 7a]
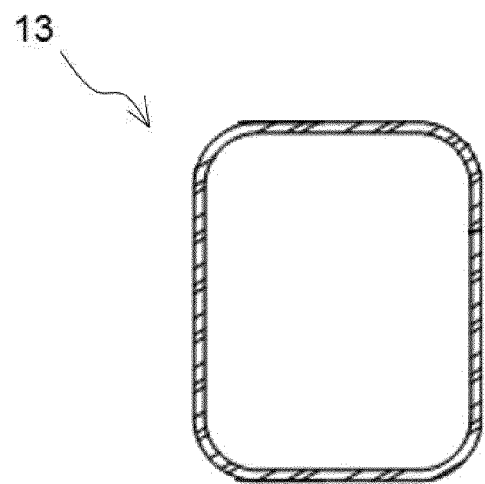
[Fig. 7b]
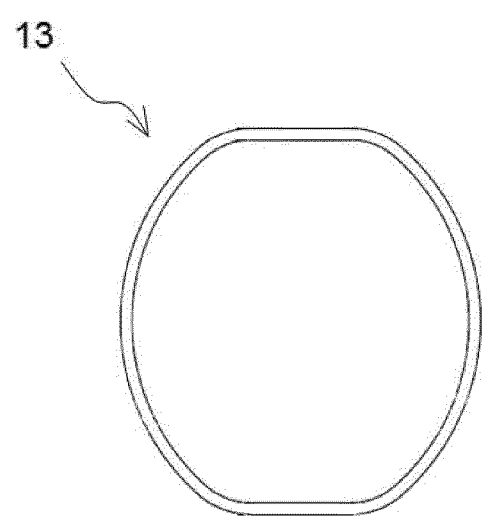

[Fig. 8]
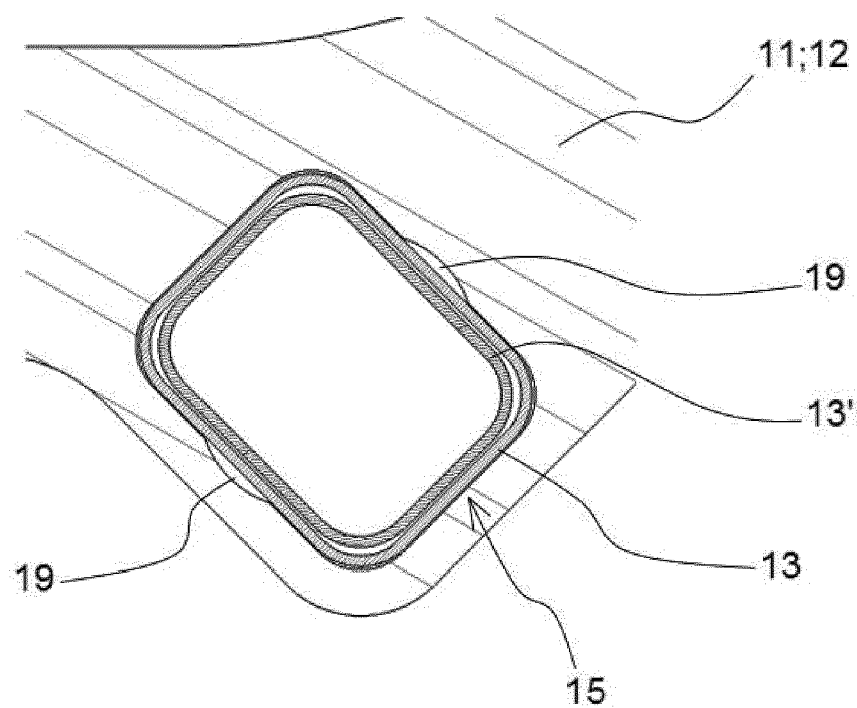

METHOD FOR ASSEMBLING A BEAM AND A STRUCTURAL ELEMENT OF AN AIRPLANE SEAT

CROSS-REFERENCE TO RELATED APPLICATIONS

This application is a national stage application of International Patent Application PCT/EP2019/081589, filed on Nov. 18, 2019, which claims priority to France Patent Application No. 1871820, filed on Nov. 26, 2018 and France Patent Application No. 1900616, filed on Jan. 24, 2019, all of which are hereby incorporated by reference in their entireties.

The present invention relates to a method for assembling a beam and a structural element together in an aircraft seat. The invention is particularly advantageously applicable to the realization of aircraft seats of "economy" class or "business" class type.

In a conventional manner, aircraft seats include structural elements, such as armrest crossheads or support legs, mounted on beams. To this end, each structural element includes a beam passage area, so that the assembly may be fixed by means of screws through openings in the beam and the structural element. An alternative solution is to use screw clamping mechanisms.

There are a variety of possible configurations for the same seat, when considering seat dimensions of spaces and rail positioning, which vary from one aircraft type to another. The use of a screw system generates an industrial constraint associated with the significant amount of bore references to be provided in advance in the beams according to the seat configuration. In addition, the screws increase the weight of the whole.

The invention aims at effectively remedying these disadvantages by proposing a method for assembling a beam and a structural element together in an aircraft seat, characterized in that it comprises:

a step of providing at least one recess in an inner face of a beam passing area of the structural element, a step of inserting the beam into the beam passing area, and a step of deforming the beam, so that a deformed portion of the beam enters the recess of the beam passing area.

The invention thus enables, through the connection of the beam and the structural element with one another via the recess and the corresponding deformation of the beam, to make the assembly easier, while avoiding the use of screws and associated passage holes in the beam. The invention enables to easily control the diversity of seat configurations, while reducing the weight of the whole. The invention also provides a time saving for the assembly relative to the state-of-the-art method requiring numerous screwing operations.

According to one embodiment, said method further comprises a step of deforming the beam passing area, so that at least a portion of an inner face of said beam passing area bears on an outer face of the beam along a contact surface.

According to one embodiment, said method further comprises a step of deforming the beam passing area, so that at least two portions of the inner face of the beam passing area bear on an outer face of the beam along two contact surfaces, said contact surfaces being axially located on both sides of the recess.

According to one embodiment, a cross-section of the beam is hollow and not circular.

According to one embodiment, a cross-section of the beam is chosen in particular among the following shape profiles: rectangular, rectangular with rounded sides, square, or ovoid.

According to one embodiment, the recess has the shape of a spherical cap or the shape of a groove.

According to one embodiment, the recess is a non-through recess.

According to one embodiment, a recess depth is of the order of a beam wall thickness.

According to one embodiment, a maximum recess width is less than a structural element width measured at the beam passing area.

According to one embodiment, two recesses are formed in two opposite faces of the beam. As a variant, the recesses are made in two consecutive sides of the beam.

According to one embodiment, the structural element is a seat crosshead or a support leg, or any other additional fastener directly mounted on the beam.

According to one embodiment, said method further comprises a step of inserting at least one second beam into the beam so as to locally reinforce the whole.

The invention also relates to an aircraft seat structure comprising at least a structural element and at least a beam, characterized in that the structural element comprises at least a recess in an inner face of a beam passing area of the structural element, and in that the beam includes a deformed portion entering said recess in the beam passing area.

According to one embodiment, at least two portions of the inner face of the beam passing area bear on an outer face of the beam along two contact surfaces, said contact surfaces being axially located on both sides of the recess.

According to one embodiment, the beam and/or the structural element are made of a material having a plastic elongation between 5% and 15%, which is sufficient for their deformation during the assembly.

According to one embodiment, the beam and/or the structural element are made of a material selected among the following materials: aluminum, steel, magnesium, or stainless steel.

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could contribute, if need be, to its definition, in which:

FIG. 1 is a perspective view of a seat structure according to the present invention;

FIGS. 2a and 2b are views illustrating different embodiments of a recess in an inner face of a beam passing area of a seat structural element;

FIG. 3 is a perspective view illustrating the step of inserting a beam into a beam passing area of a seat structural element;

FIGS. 4a and 4b are sectional and side views illustrating the installation of a deforming tool inside the beam;

FIGS. 5a and 5b are perspective and side views illustrating the step of deforming the beam in the method according to the invention;

FIGS. 6a and 6b are perspective and side views of the assembly beam-seat structural element at the end of the method according to the present invention;

FIGS. 7a and 7b are views of various forms of a cross-section of a beam used in the assembly according to the invention;

FIG. 8 is a sectional view of a variant embodiment including a further beam inside a main beam.

It should be noted that, in the figures, the structural and/or functional elements common to the different embodiments may have the same references. Thus, unless otherwise stated, such elements have identical structural, dimensional and material properties.

FIG. 1 shows an aircraft seat structure 10 comprising structural elements, in the present case crossheads 11 for carrying armrests or backrests as well as support legs 12 for placing and fixing the seat on the aircraft floor. The structural elements 11, 12 are mounted on two beams 13 of elongated shape. The beams 13 are hollow and extend along longitudinal directions substantially parallel to one another. The beams 13 are preferably mounted transversely to the aircraft axis.

In the illustrated example of a triple seat, the seat structure 10 includes four crossheads 11 and two support legs 12. Of course, the number of crossheads 11 and support legs 12 will vary depending the seat configuration, and in particular the desired seating capacity.

Below it is described, with reference to FIGS. 2 to 6b, the method of assembling a beam 13 and a structural element 11, 12 together in the aircraft seat.

To ensure the mounting of the beams 13, the structural element 11, 12 includes a beam passing area 15, as shown in FIG. 2a. This beam passing area 15 includes a wall 16 delimiting a through opening 17 of axis X1 allowing the passage of the beam 13. In order to limit the relative movements in rotation of the structural element 11, 12 relative to the beam 13, said beam 13 and said beam passing area 15 have cross-sections of non-circular shape. The beam 13 is preferably a tubular profile and therefore has a hollow cross-section.

In the embodiment shown in particular in FIG. 7a, the beam 13 has a rectangular cross-section. Alternatively, as shown in FIG. 7b, the beam 13 has a rectangular cross-section with rounded sides. In this case, the longer sides of the rectangle are rounded so as to have an outwardly-curved shape. As a variant, the shorter sides of the rectangle may have a rounded shape. Alternatively, the beam 13 may have a square or oval cross-section, or any other not circular cross-section suitable for the application. In all cases, the beam passing area 15 has a cross-section with a shape corresponding to that of the beam 13. A wall thickness of the profile of the beam 13 (rectangular, square or ovoid or other) is preferably between 1 mm and 3 mm.

In the case where it is possible to perform a position indexing of the beam 13 relative to the beam passing area 15, it will be however possible to use beams 13 with a circular section. The position indexing can be performed with the help of a groove in the beam 13 to be indexed in a corresponding rib in the beam passing area 15, or vice versa. Whatever the shape of the profile of the beam 13 chosen, its size is such that the external contour of the beam 13 is circumscribed in particular in a square with a side of 60 mm.

A first step of the assembling method consists in producing, by a machining process, at least one recess 19 in an inner face of the beam passing area 15 in the structural element 11, 12. The recess 19 has the shape of a spherical portion, i.e. the shape of a spherical cap. To this end, the machining process for the recess 19 may be realized with the help of a tool 22 having a spherical shape. The recess 19 is a non-through recess. A depth of the recess 19 is of the order of a wall thickness of the beam 13, and is in particular between 1 mm and 2.5 mm, and is preferably 1.5 mm apart from the machining tolerances. Preferably, a maximum width of the recess 19 is inferior to a width of the structural element 11, 12 measured at the beam passing area 15.

Two recesses 19 are advantageously made in two opposite faces of the beam 13. Alternatively, the recesses 19 are made in two consecutive faces of the beam 13.

Alternatively, as shown in FIG. 2b, it is possible to make a recess 19 having a shape of double spherical portions overlapping with one another. Any other application-suitable hollow shape can be performed in an inner face of the area 15. Alternatively, the recess 19 may have a groove shape.

It is also possible to make notches 20 in the outer face of the structural element 11, 12, notably of the beam passing area 15, in order to reduce connection looseness between the beam 13 and the structural element 11, 12. These notches 20 formed by deformed portions of the structural element 11, 12 are advantageously carried out on the side of the axial ends of the beam passing area 15.

As it can be seen in FIG. 3, the beam 13 is inserted into the beam passing area 15 through the opening 17. A deformation tool 22 for the beam 13 is then installed, as it is shown in FIGS. 4a and 4b. More specifically, the tool 22 comprises an assembly, notably formed by two punches and a cam 24 between the punches 23. This assembly is designed to be inserted into the hollow beam 13. The punches 23 advantageously have a shape complementary to that of the recesses 19. The punches 23 are radially movable between a rest position and an active position. To this end, the cam 24 ensures the displacement of the punches 23 when it is rotated. The rotation of the cam 24 may be made manually via a driving shaft or automatically for example with the help of an electric motor.

Furthermore, the tool 22 comprises two jaws 25 articulated to one another and intended to grip two opposite faces of the beam 13. A jaw 25 includes projecting portions 26, each of them cooperating with a notch 20 of corresponding shape.

As it can be seen in FIGS. 5a and 5b, the tool 22 then deforms the beam 13, so that a deformed portion 27 of the beam 13 enters the recess 19 corresponding to the beam passing area 15. To this end, the cam 24 is rotated in order to radially move the punches 23, which locally deform the beam 13, so as to cause a portion 27 of the outer face of the beam 13 to enter in complementary manner into a corresponding recess 19.

The jaws 25 also deform the beam passing area 15 at the notches 20, so that two (or more) portions of the inner face of the beam passing area 15 bear on an outer face of the beam 13 along two contact surfaces 29. The contact surfaces 29 are located axially on both sides of the recess 19.

These contact surfaces 29 make it possible to limit a looseness between the beam 13 and the beam passing area 15 generated by the plastic deformation of the outer face of the beam 13.

The deformation tool 22 is then removed. Thus, a part assembly is obtained, in which the beam 13 includes at least one deformed portion 27 entering a recess 19 of the beam passing area 15, such as it is shown in FIGS. 6a and 6b. In this case, two deformed portions 27 enter two opposite recesses 19. Of course, it is possible to provide a single recess 19, or more than two recesses, in the beam passing area 15. It depends on the application and the desired level of resistance of the mechanical connection. The assembly also includes two contact surfaces 29 between the inner face of the beam passing area 15 and the outer face of the beam 13. It is also possible to provide one or more than two contact surfaces 29. The realization of the contact surfaces 29 is however not essential.

Advantageously, the beam 13 and/or the structural element 11, 12 are made from a material having a plastic elongation between 5% and 15%, which is sufficient for the deformation during the assembly. The beam 13 and/or the structural element 11, 12 notably have a mechanical resistance to a breaking stress at least equal to 450 MPa for a material made in a particular type of aluminum.

The beam 13 and/or the structural element 11, 12 are made from a material selected among the following materials: aluminum, in particular of series 7000 according to a standard definition, steel, magnesium, or stainless steel.

Alternatively, the method according to the invention can be implemented with other parts than a crosshead 11 or a support leg 12, in particular any fastener mounted directly on the beam, such as a fastener for fixing a seating surface, footrests, or electrical boxes.

As it is illustrated in FIG. 8, it is possible to insert a second hollow beam 13' into the hollow portion of the beam 13 in order to locally reinforce the structure. This beam 13' is assembled with the first beam 13 via the same method for securing the beam 13 to the structural element 11, 12. The beams 13, 13' can be mounted together inside the beam passing area 15 or separately after one another. Alternatively, it is possible to insert more than two beams 13, 13' into one another to locally reinforce the structure.

Of course the different features, variants and/or embodiments of the present invention can be associated with one another in various combinations insofar as they are not incompatible or exclusive with one another.

Obviously, the invention is not limited to the embodiments described above and provided by way of example only. It encompasses various modifications, alternative forms and other variants a person skilled in the art may consider in the context of the present invention and in particular any combination of the various operating modes described above, which may be taken separately or in combination.

The invention claimed is:

1. A method for assembling a beam and a structural element together in an aircraft seat, the method comprising:
    a step for providing at least one recess in an inner face of a beam passing area of the structural element,
    a step of inserting the beam into the beam passing area, and
    a step of deforming the beam, so that a deformed portion of the beam enters the recess of the beam passing area, the method further comprising a step for deforming the beam passing area, so that at least a portion of an inner face of said beam passing area bears on an outer face of the beam along a contact surface.

2. The method according to claim 1, further comprising a step of deforming the beam passing area, so that at least two portions of the inner face of the beam passing area bear on an outer face of the beam along two contact surfaces, said contact surfaces axially located being on both sides of the recess.

3. The method according to claim 1, wherein a cross-section of the beam is hollow and non-circular.

4. The method according to claim 1, wherein a cross-section of the beam is chosen among the following shape profiles: rectangular, rectangular with rounded sides, square, or ovoid.

5. The method according to claim 1, wherein the recess has the shape of a spherical cap.

6. The method according to claim 1, wherein the recess is a non-through recess.

7. The method according to claim 1, wherein a depth of the recess is of the order of a wall thickness of the beam.

8. The method according to claim 1, wherein a maximum width of the recess is less than a width of the structural element measured at the beam passing area.

9. The method according to claim 1, wherein two recesses are formed in two opposite faces of the beam.

10. The method according to claim 1, wherein the structural element is a seat crosshead or a support leg or any other additional fastener directly mounted on the beam.

11. The method according to claim 1, further comprising a step of inserting at least a second beam into the beam.

12. An aircraft seat structure comprising at least a structural element and at least a beam, wherein the structural element comprises at least a recess in an inner face of a beam passing area of the structural element, wherein the beam comprises a deformed portion entering said recess in the beam passing area, wherein at least a portion of an inner face of said beam passing area bears on an outer face of the beam along a contact surface, two notches being made in the outer face of the beam passing area of the structural element, the notches being made on both sides of the recess, to form two portions of the inner face of the beam passing area bearing on an outer face the beam along two contact surfaces, said contact surfaces being axially located on both sides of the recess, in order to reduce connection looseness between the beam and the structural element.

13. The aircraft seat structure according to claim 11, wherein the beam and/or the structural element are made of a material having a plastic elongation between 5% and 15%, which is sufficient for their deformation during the assembly.

14. The aircraft seat structure according to claim 11, wherein the beam and/or the structural element are made of a material selected among the following materials: aluminum, steel, magnesium, or stainless steel.

\* \* \* \* \*